United States Patent [19]
Sutherland et al.

[11] Patent Number: 5,638,009
[45] Date of Patent: Jun. 10, 1997

[54] THREE CONDUCTOR ASYNCHRONOUS SIGNALING

[75] Inventors: Ivan E. Sutherland, Santa Monica, Calif.; Charles E. Molnar, Webster Grove, Mo.

[73] Assignee: Sun Microsystems, Inc., Mountain View, Calif.

[21] Appl. No.: 333,554

[22] Filed: Nov. 2, 1994

Related U.S. Application Data

[63] Continuation-in-part of Ser. No. 140,654, Oct. 21, 1993, abandoned, and Ser. No. 140,655, Oct. 21, 1993, abandoned.

[51] Int. Cl.⁶ .................................................. H03K 19/0185
[52] U.S. Cl. ............................ 326/83; 326/93; 326/98
[58] Field of Search ............................. 326/93, 95, 98, 326/83

[56] References Cited

U.S. PATENT DOCUMENTS

| | | | |
|---|---|---|---|
| 4,972,432 | 11/1990 | Wilson et al. | 370/5 |
| 5,168,178 | 12/1992 | Allen et al. | 326/17 |
| 5,258,666 | 11/1993 | Furuki | 326/95 |
| 5,382,844 | 1/1995 | Knauer | 326/95 |

*Primary Examiner*—Edward P. Westin
*Assistant Examiner*—Benjamin D. Driscoll
*Attorney, Agent, or Firm*—Townsend and Townsend and Crew LLP; Robert C. Colwell

[57] ABSTRACT

A technique is described for transmitting events over three or more conductors in which a sequence of activity of the conductors for information transfer is provided. To transfer information, the conductors are placed in an active state in a sequential manner, and then returned to an inactive state after each has been active in a time period short enough to prevent all conductors from being active at the same time.

13 Claims, 5 Drawing Sheets

THREE CONDUCTOR ASYNCHRONOUS SIGNALING

CROSS-REFERENCE TO RELATED APPLICATION

This is a continuation-in-part patent application of Ser. No. 08/140,654, filed Oct. 21, 1993, entitled "Counterflow Pipeline", abandoned; and Ser. No. 08/140,655, filed Oct. 21, 1993, entitled "Counterflow Pipeline Processor", abandoned.

BACKGROUND OF THE INVENTION

This invention relates to the transmission of events over conductors, preferably for use in digital systems, and in particular to a signaling technique employing three or more conductors.

One well known technique for conveying events within computer systems typically uses a single conductor for the signal. The state of the conductor is raised (or lowered) from a steady state condition, and then returned to the steady state condition. The resulting pulse, or one edge thereof, is used to denote the occurrence of an event. For example, the conductor normally may be at a potential of 0 volts. A potential source then is switchably coupled to the conductor, causing the state of the conductor to change from 0 volts to a higher or lower potential, for example, 3 volts. When the potential source is disconnected, the conductor returns to its 0 volt state. The rising edge of the pulse, the falling edge of the pulse, the interval of higher potential, or even the combination of the rising and falling edges can be used to denote the occurrence of an event.

In another form of prior art signaling, known as differential transmission, a pair of conductors is used which couple the sending and receiving circuits together. In this form of transmission of events, the states of the two lines remain opposite to each other. For example, one line is held at 0 volts while the other line is held at 3 volts. Then to designate the occurrence of an event, the states of the two lines are changed simultaneously. That is, the low line is switched high, while the high line is switched low. These two transitions are used together to designate the occurrence of an event.

These and other forms of signaling suffer from several disadvantages. Some of them are inherently slow because they require the conductor to return to its original state before a subsequent event can occur. In other words there is a time delay to reset the conductor. During this delay no information can be transmitted over the conductor. Another disadvantage is that there is the possibility of ambiguity in the transmission of information. When examining the state of the conductor or conductors at any given instant, one cannot be certain exactly what information is present. For example, using the 3 volt circumstance described above, if the state of the conductor is 1.8 volts, the system within which the conductor functions cannot know whether the conductor is transitioning to a high or to a low condition. The system must wait to determine whether the conductor will be at 0 or at 3 volts, then interpret that information accordingly.

SUMMARY OF THE INVENTION

We have developed a technique for the transmission of information which is particularly well suited for use in asynchronous digital systems. Asynchronous computers are computers in which execution of instructions proceeds as rapidly as data and instructions are available. In a preferred embodiment our technique for conveying information from one location to another involves the use of three conductors. We use three conductors (or more), because the use of three conductors allows us to transmit events more quickly and reliably from point to point than does the use of one or two conductors.

According to the technique of our invention the use of three conductors provides several advantages. First, because in the preferred embodiment, every event appears as a transition on one of the three conductors, all events use an identical signaling transition direction. This makes transition delays more uniform than when the use of only one or two conductors is employed, and transitions in both directions are used. A second advantage of three conductors is that it is faster than systems requiring one or more conductors to return to their original states. There is no need to form a pulse. Furthermore, the use of three conductors eliminates ambiguity between "this—next" and "this—previous" conditions. Even when two of the conductors are active, the meaning will be unambiguous by considering which conductor transitioned most recently. This allows each of the three conductors to be returned to its inactive state less quickly than it was placed in its active state without penalizing the transmission rate. A fourth advantage of using three conductors for the transmission of information is that it allows for arbitration. That is, the state of two of the conductors can be used to resolve an ambiguous state of the third conductor. These and other advantages of the invention are described further below.

In a preferred embodiment a method of transmitting information over at least three conductors includes the steps of defining a required sequence of activity of the three conductors for information transfer over the conductors; placing the first conductor in an active state to designate the occurrence of an event; placing the second conductor in an active state to designate the occurrence of another event; placing the third conductor in an active state to designate the occurrence of a further event; and returning the first, second and third conductors to an inactive state after the next conductor is active quickly enough to not allow all three conductors to be active at the same time.

DESCRIPTION OF THE SPECIFIC EMBODIMENTS

Figure 1:
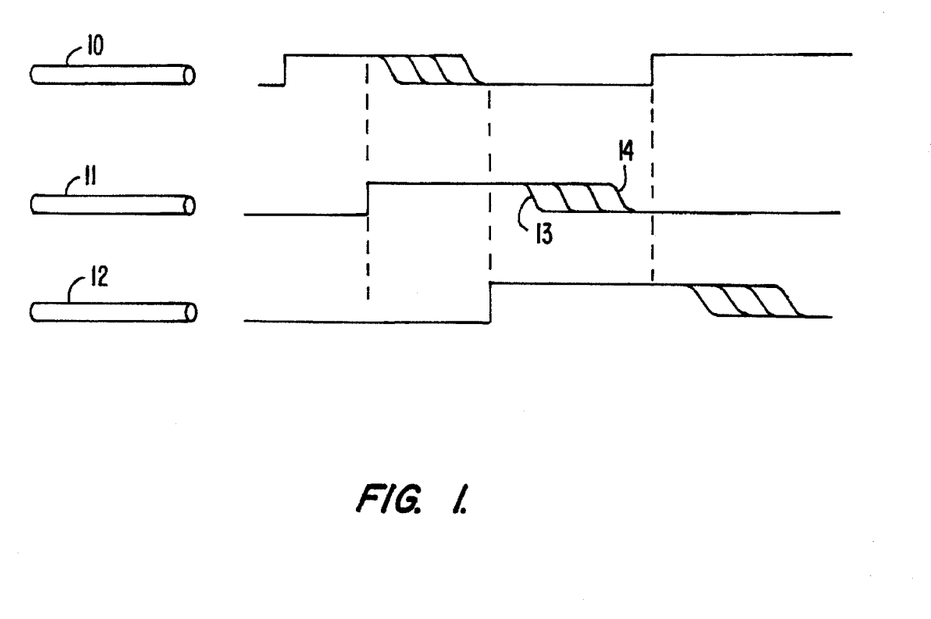
FIG. 1 illustrates a preferred embodiment of the invention of a technique for transmitting information over three conductors.

In the preferred embodiment of using three conductors for transmission of information, we use a coding scheme of one conductor active to designate the transmission of information on the conductors. That is, in the preferred embodiment, at any given instant at most two of the three conductors is in an active state. The three conductors 10, 11, 12 are illustrated in FIG. 1. The active state will be characterized by a change in potential or other desired electrical property, such as current. For example, in this embodiment the active conductor will change in potential from a low to a high as shown, or from a high to a low, while the other two conductors remain at a constant potential. Note the timing diagram also shown in FIG. 1. At the time the desired conductor, for example line 11, is raised to a high potential, one or both of the other two conductors typically will be quiescent. Making a new conductor 12 high signals the occurrence of another event. After each conductor is raised to high potential, it then can be returned to a low potential to prepare to signal another event. As shown in FIG. 1 conductor 11 can be returned to low potential, at the earliest, after conductor 12 goes high (see waveform 13), and at the latest, just before line 10 goes high (see waveform 14). The other two conductors have similar timing requirements. Preferably the conductors are activated in a desired order as shown, for example, 0, 1, 2, 0, 1, 2, .... If two conductors are active at the same time, then the conductor most recently active is the conductor with the desired signal. By convention, all three conductors active has no meaning. (Although we refer to three conductors herein, it should be understood that the techniques described are clearly equally applicable to four, or more, conductors.)

In the preceding description, transition signaling was used to encode an event. In other words, each voltage swing on the conductor signaled an event. Because both rising and falling transitions on a conductor represent events, simple circuit implementations use pull-up and pull-down transistors that are symmetric. Of course, other coding schemes also can be used in conjunction with the three conductor approach of our invention. For example, as illustrated in FIG. 1, for our preferred system one can assign meaning to transitions in one direction and ignore those transitions in the other direction. In such a system, each event is represented only by the leading edge of a pulse, e.g., a rising transition.

Our preferred technique is to use a "one-hot" scheme as described above. In such a case events are indicated by an identical voltage transition on one of the three conductors used in succession. Recovery of the conductor to the inactive state thus can be accomplished at leisure. In this case an event is deemed to have occurred when a new conductor transitions to an active state, regardless of the state of the other conductors. If "1" indicates active, then the successive states are: 001, 010, 100. Additionally, the state of the active conductor can be reset, even after the next conductor becomes active. Thus, the sequence can be 001, 011, 010, 110, 100, 101, 001, where the bold lettering represents the arrival of a new event.

Using three conductors for the transmission of information has several advantages. Because each event, by convention, is considered to be the onset of an event on one of the three conductors, all events will have an identical signaling transition direction. This makes transition delays more uniform. Additionally, because the recovery transition is ignored, it can be relatively slow. Secondly, the three conductors eliminate ambiguity between conditions. When one conductor is on, it is known what the previous state was, as well as the what the next state will be. Even when two of the conductors are active, the meaning will be unambiguous by considering which conductor transitioned most recently. This feature enables the use of well known domino logic, because the state of the next conductor may transition before the previous conductor has been reset.

Additionally, the use of three conductors allows for the use of arbitration. If the next conductor to change state transitions incompletely, the event may still be properly interpreted by the system. That is, the state of two of the conductors can be used to resolve an ambiguous state of the third conductor. For example, consider the situation in which the first conductor is active and the third conductor is inactive. Suppose that the second conductor changes to a partially active, or otherwise ambiguous condition. In this case the states of the three conductors (in numerical order) may be considered to be either: active, active, inactive, thereby accepting the event; or active, inactive, inactive, thereby ignoring the event. If the event is accepted, then the system will interpret the ambiguous condition as the active, active, inactive condition. At a later time, when the condition has unambiguously reached active, active, inactive, the system is able to ignore the event, properly interpreting it as the completion of a former event, rather than misinterpret it as a new event. Additionally, by comparing the complete event to the output, the system can determine that the event has been previously considered.

As has been described the use of three conductors provides a type of directionality. If one considers three possible states of the three conductors as:

Red=active, inactive, inactive;
Green=inactive, active, inactive; and
Blue=inactive, inactive, active;

then an incomplete transition from Red to Green is unambiguously on its way from Red to Green, and not from Blue to Green. An incomplete transition from Green to Blue is unambiguously on its way from Green to Blue and not from Blue to Red, etc. Contrast this situation with two phase signaling as is sometimes conventionally employed. An incomplete transition from high to low cannot be distinguished from an opposite transition from low to high. This directionality enables circuits employing three conductor input signals to be made which provide unique benefits, especially in the design of asynchronous computers. Three such circuits are described below.

Figure 2:
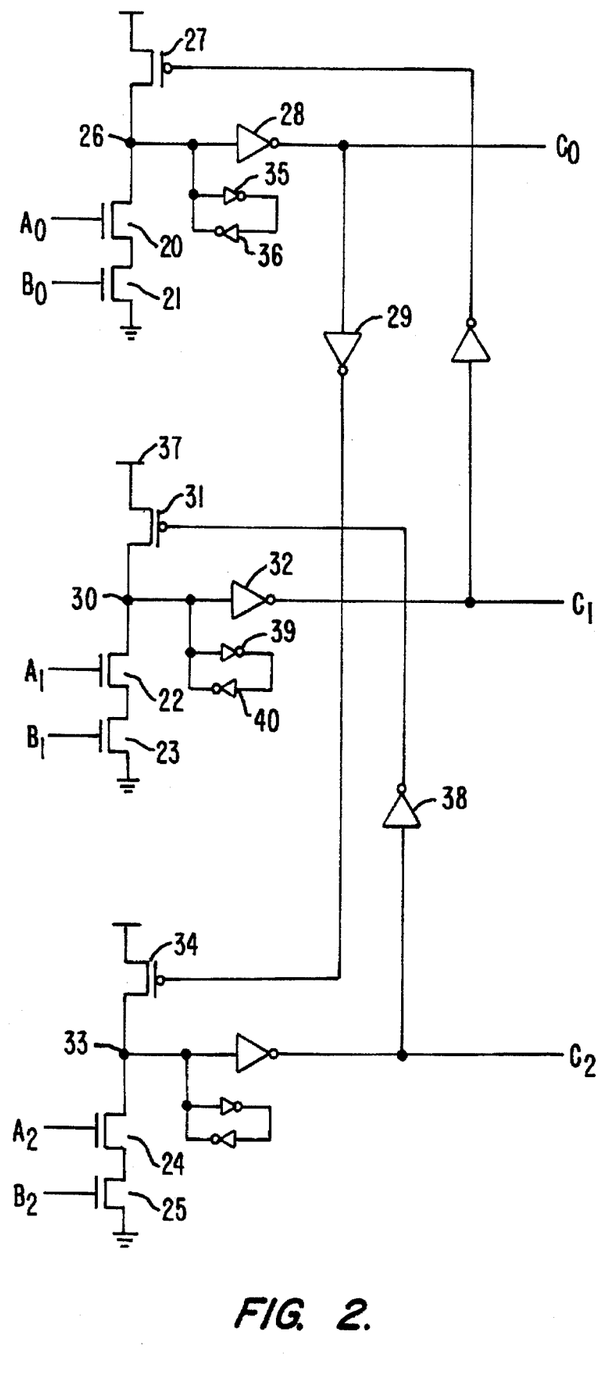
FIG. 2 is a circuit schematic illustrating a rendezvous circuit.

A circuit which emits an event after receiving an event on both of its input terminals is known as a rendezvous element. FIG. 2 depicts a rendezvous element for three conductor asynchronous signaling. As shown in FIG. 2, the circuit includes three sections coupled respectively to output conductors C0, C1, and C2. Each section includes a set of similar components. For example, the section of the rendezvous element coupled to output line C1 includes a PMOS transistor 31 coupled between a high potential 37 and a node 30. The gate of PMOS transistor 31 is controlled by an inverter 38 coupled to the output line C2. A pair of NMOS transistors 22 and 23 are serially connected between node 30 and ground. The NMOS transistors receive input signals A1 and B1 which control their gates. Node 30 is also coupled through inverter 32 to output line C1. As a result, the state of node 30 controls the state of output line C1. A pair of inverters 39 and 40 are also coupled to node 30 and function to maintain a stable condition at node 30. Because the inverters 39 and 40 are fabricated using smaller transistors than the other transistors shown in the circuit, the inverters themselves are drawn smaller. This is intended to denote the fact that the state of node 30 can be overridden by transistors 22, 23, and 31, and is maintained in a stable condition by inverters 39 and 40.

In the circuit of FIG. 2, each output line is connected by an inverter to the PMOS transistor in another portion of the circuit. For example, output line C2 is coupled through inverter 38 to the portion of the circuit controlling output line C1. Similarly, inverter 29 couples output line C0 to transistor 34 in the portion of the circuit controlling output line C2. As will be described further below, this chain of inverters assures that another portion of the circuit will be "reset" each time an output line changes state.

In operation, as shown in FIG. 2, whenever any pair of input signals Ax, Bx are asserted, one output conductor goes high and one goes low. The following example should make this clear. Input signals A0 and B0 are supplied to a pair of NMOS transistors 20 and 21. Transistors 20 and 21 are serially connected to node 26, which was initially held high by transistor 27 being on. When both A0 and B0 are present, however, node 26 is pulled low, making output conductor C0 go high. The high signal on conductor C0, through inverter 29, turns on transistor 34, keeping node 33 high and output C2 low. In a similar manner, if A2 and B2 are on, node 33 is pulled low, driving C2 high, turning on transistor 31 to keep node 30 high and therefore output C1 low. Inverters 35 and 36 function as a "keeper" to maintain a stable condition at node 26. Because the inverters 35 and 36 are fabricated using smaller transistors than transistors 20, 21, and 27, the state at node 26 can be overridden by the on conditions of transistor 20 and 21, or transistor 27. After an output signal event, the state of the input nodes is again considered.

A rendezvous element such as depicted in FIG. 2 is described by the equations below, where A and B are three conductor input signals on lines 0, 1, and 2, and C is a three conductor output signal on lines 0, 1, and 2. The "↑" means that conductor goes high, while the "↓" means that conductor goes low.

$$C0\uparrow = A0 \cdot B0, \text{ then } C0\uparrow \text{ causes } C2\downarrow$$

$$C1\uparrow = A1 \cdot B1, \text{ then } C1\uparrow \text{ causes } C0\downarrow$$

$$C2\uparrow = A2 \cdot B2, \text{ then } C2\uparrow \text{ causes } C1\downarrow$$

Thus, when input conductors A0 and B0 are asserted, output conductor C0 is asserted, which causes output conductor C2 to be not asserted. When input conductors A1 and B1 are asserted, output conductor C1 is asserted, causing output conductor C0 to be not asserted. Finally, when input conductors A2 and B2 are asserted, output conductor C2 is asserted causing output conductor C1 to be not asserted. The states of the other nonspecified input conductors do not effect the output in each of the cases described.

Figure 3:
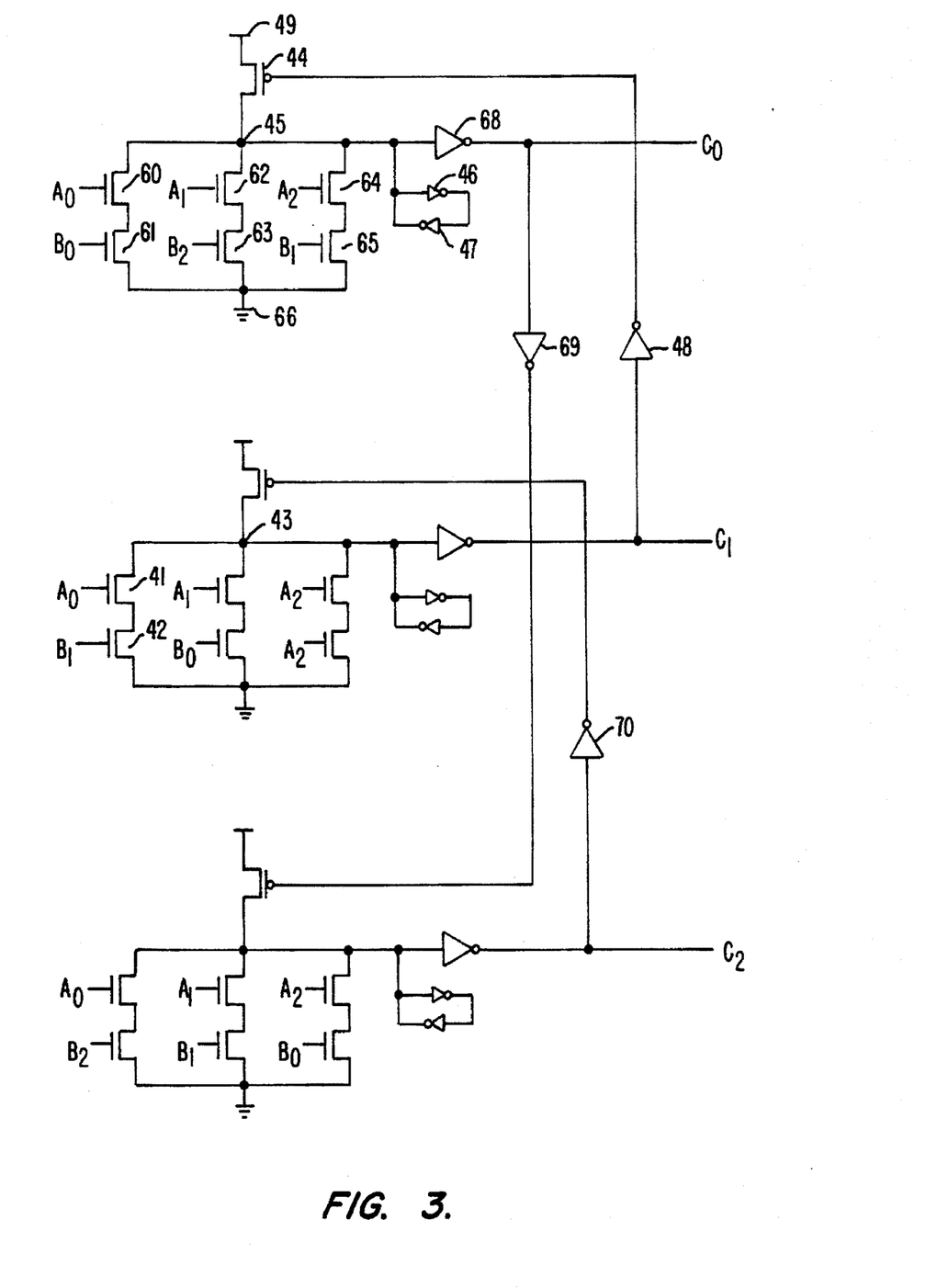
FIG. 3 is a circuit schematic illustrating a merge circuit.

A circuit which emits an event at its output after either of its inputs receives a signal is known as a merge circuit. FIG. 3 depicts a merge circuit for three conductor asynchronous signaling. The circuit shown in FIG. 3 includes three portions, generally shown at the upper, middle, and lower portion of the figure. Each portion is connected to a respective output line. For example, the upper portion of the circuit controls the state of output line C0, while the middle portion of the circuit controls output C1, and the lower portion controls output C1. In a manner somewhat similar to FIG. 2, each section of the circuit includes similar components, and accordingly only one portion is described below.

The upper portion of the circuit shown in FIG. 3 includes a PMOS transistor 44 which switchably couples a node 45 to a high potential 49. Node 45 is also coupled through pairs of transistors connected to input signals to ground potential 66. For example, node 45 may be connected to ground 66 by the presence of input signals A0 and B0 controlling transistors 60 and 61. Alternatively, node 45 may be pulled low by the presence of input signals A1 and B2 on transistors 62 and 63, or by the presence of input signals A2 and B1 on transistors 64 and 65. Node 45 controls the state of output line C0 through inverter 68. Thus, when both transistors of any one of the three pairs of serially connected transistors are on, node 45 will be pulled to ground. Inverter 68 will therefore cause output line C0 to be driven high.

In a manner similar to that described in conjunction with FIG. 2, each output line is coupled through an inverter to another portion of the circuit. For example, output line C1, through inverter 48, controls the state of transistor 44, thereby allowing node 45 to be reset when output line C1 changes state. A similar inverter 69 couples output line C0 to the lower portion of the circuit, while an inverter 70 couples output line C2 to the middle portion of the circuit. As described in conjunction with FIG. 2, a pair of inverters 46 and 47 function as "keepers" for output line C0.

Each of the portions of the circuit shown in FIG. 3 include corresponding components, however with different combinations of input signals to the pairs of serially-connected NMOS transistors. For example, transistors 41 and 42 receive input signals A0 and B1, a combination which does not appear anywhere else in the circuit. Thus, as shown in the figure, whenever any pair of input signals Ax, By is active, a corresponding node will be pulled low, driving the output line coupled to that node high. For example, assume that conductor B1 is active and a signal is received on conductor A0. With A0 and B1 both active (high), transistors 41 and 42 are turned on. This pulls node 43 low, driving output C1 high. The high state on C1, through inverter 48, turns on PMOS device 44 to pull node 45 high, holding output C0 low. Each of the other portions of the circuit function in the same manner.

Thus, the equations describing a merge circuit, where "↑" and "↓" mean the conductor goes high and low, respectively, are:

$$C0\uparrow = A0 \cdot B0 \cup A1 \cdot B2 \cup A2 \cdot B1, \text{ then } C0\uparrow \text{ causes } C2\downarrow$$

$$C1\uparrow = A0 \cdot B1 \cup A1 \cdot B0 \cup A2 \cdot B2, \text{ then } C1\uparrow \text{ causes } C0\downarrow$$

$$C2\uparrow = A0 \cdot B2 \cup A1 \cdot B1 \cup A2 \cdot B0, \text{ then } C2\uparrow \text{ causes } C1\downarrow$$

Thus, when A0 and B0 are active, or A1 and B2 are active, or A2 and B1 are active, the merge circuit will make conductor C0 active, in turn causing conductor C2 to be inactive. Similarly, when A0 and B1 are active, or At and B0 are active, or A2 and B2 are active, the merge circuit will make conductor C1 active, causing conductor C0 to be inactive. Finally, when A0 and B2 are active, or A1 and B1 are active, or A2 and B0 are active the merge circuit will make conductor C2 active, causing conductor C1 inactive. Thus, whenever any input signal is received, an output signal is supplied, with the specific output signal depending upon the specific input signal received.

Figure 4:
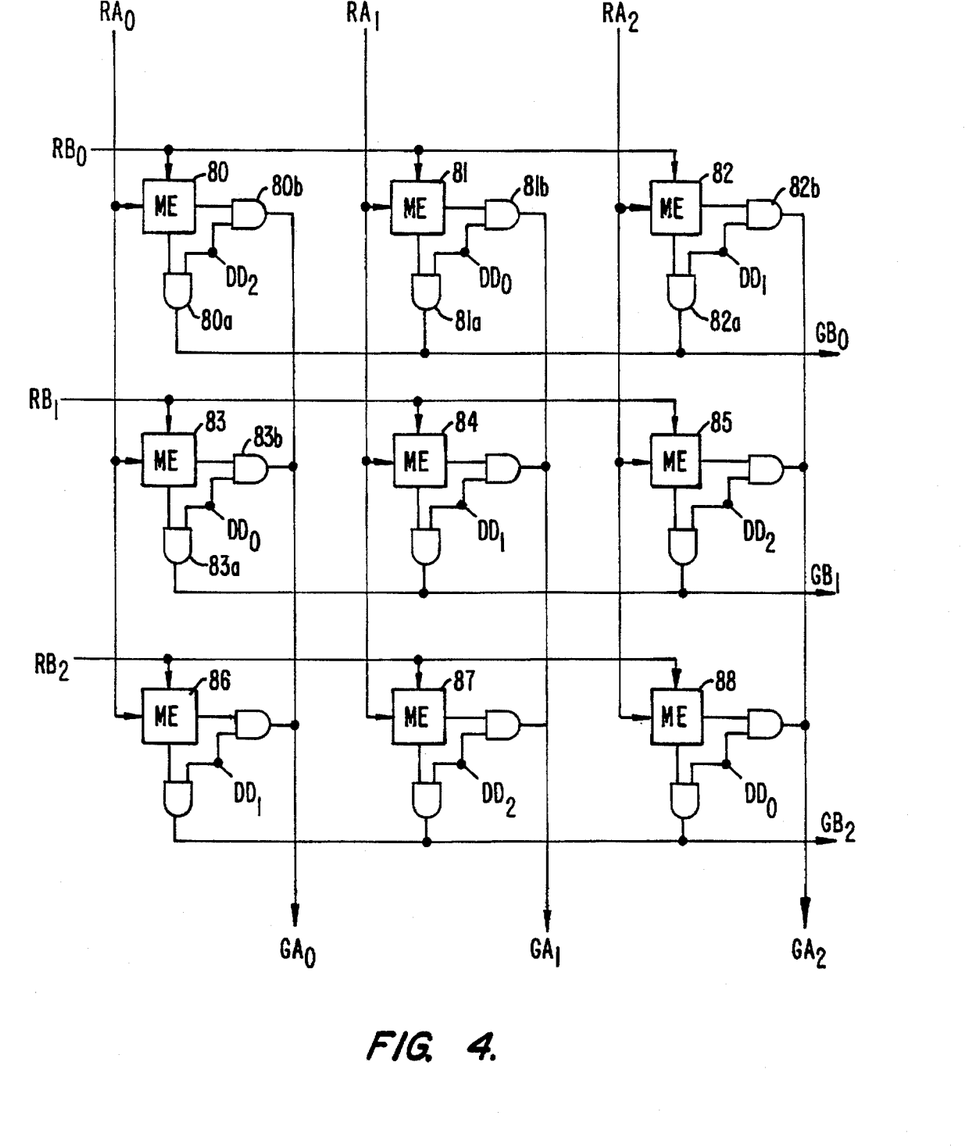
FIG. 4 is a circuit schematic illustrating a transition arbiter.

A circuit used to select one of two contenders for service is called an arbiter. One form of arbiter known in the art can receive request input signals on two nodes, and a completion input signal on another input node. It provides grant output signals on two output nodes. All of its inputs and outputs are event signals. Such an arbiter will deliver output grant events in response to the corresponding request inputs, but regardless of how closely spaced in time are the input requests, will deliver only a single grant output between completion input events. FIG. 4 illustrates a transition arbiter using the preferred three conductor—one hot encoding scheme of our invention. The arbiter receives three input signals RA, RB, and DD, representing Request A, Request B, and Done. Each of the three signals itself can be received over three conductors, designated 0, 1, and 2. In response the arbiter emits output signals called GA and GB, representing Grant A and Grant B. Like the input signals, the output signals are encoded on three wires, 0, 1, and 2. Importantly, the arbiter allows for receipt of the done signal concurrently with receipt of the grant request.

In FIG. 4, the RA input signal is provided at the top of the drawing on the conductors labeled $RA_0$, $RA_1$, and $RA_2$. The RB input signal appears at the left of the drawing on the conductors labeled $RB_0$, $RB_1$, and $RB_2$. The done input signal is provided to each of the circuit blocks shown in the drawing at the input nodes labeled $DD_0$, $DD_1$, and $DD_2$. The two outputs, RA and RB, totaling six conductors in all, appear at the bottom and right sides of the drawing, and are designated $RA_0$, $RA_1$, $RA_2$, $RB_0$, $RB_1$, and $RB_2$.

The drawing also depicts nine mutual exclusion elements, designated 80, 81, ... 88. Each is depicted as a small box with input terminals at the top and left and output terminals at the right and bottom. Each effectively permits a signal to pass either vertically or horizontally, but not both. (A circuit schematic of the "ME" box is shown in detail in FIG. 5.) The AND gates associated with each exclusion element are designated with reference numerals having a's and b's corresponding to the mutual exclusion element. For example, the AND gates for element 83 are designated 83a and 83b. The AND gates collectively shown in FIG. 4 effectively form six multiplexors of three input terminals each. For example, AND gates 80a, 81a, and 82a form a multiplexer whose output controls the state of line $GB_0$. Because each multiplexor provides an output connection to the grant conductors, $GA_i$ and $GB_i$ there is an implied OR connection at the outputs of the AND gates. Each AND gate can make a conductor active, but cannot make it inactive. The only way a conductor can be recovered to prepare it for the next cycle is for the next conductor to be made active. This is more apparent if one considers that for any set of three AND gates that share a common row output node or common column output node, only one can be active at a time because they have different DD input connections. An output return circuit shown in more detail in FIG. 6 returns previous grant conductors to the inactive state as each is made active. The output return circuit is the only way that the grant conductors can be prepared for the next cycle. Below we describe the operation of the arbitration circuit.

In the initial state, assume that a high potential is active and that lines $RA_2$, $RB_2$, and $DD_2$ are high. Grant output signals on lines $GA_2$ and $GB_2$ will also be high. By this time five of the mutual exclusion elements 82, 85, 86, 87, and 88 will have been active—namely those in the right column and in the bottom row. Only the lower right element 88 will be contested, with both input nodes high, but the $DD_0$ input will be low, keeping element 88 inactive. The active state of $DD_2$ will select elements 80, 85, and 87 for output. Of these element 80 will not have been triggered, and the other two, elements 85 and 87, are not contested. Element 85 will follow the $RA_2$ input, while element 87 will follow the $RB_2$ input. Thus, initializing RA, RB, and DD, will initialize GA and GB.

Next, consider what happens with an uncontested request, for example, assume that an event drives $RA_0$ to high. Element 80 will trigger, and, because its output is selected by $DD_2$, grant line $GA_0$ will go high. Eventually line $GA_2$ will be returned to low by the output return circuit. Line $GA_2$, of course, cannot become low until input line $RA_2$ does, and the element 85 clears.

Next, consider the case of a contested request. Assume that the system is in the initial state described two paragraphs above. Suppose that concurrent requests arrive on lines $RA_0$ and $RB_0$. Element 80 must now select one or the other of the two input signals, driving the corresponding grant line high. Assume that RA is chosen, thereby placing $GA_0$ high. Eventually $RA_2$ and $RB_2$ will go low, releasing the elements in the right column and in the bottom row. Thus, all the elements in the left column and in the top row are active, and all are uncontested except for element 80 which was selected in favor of $RA_0$. At this time line $GB_2$ is not being driven at all, and is remaining high only because no other GB line is being driven. When the done signal DD advances, line $DD_0$ becomes active. This, in turn, selects elements 81 and 83. Element 83 thus drives $GA_0$, but does not change its value. Element 81 has already uncontestedly chosen $RB_0$, driving $GB_0$ high. This forces $GB_2$ to go low as a result of the return circuit.

Finally, consider the case of an "early done." Assume that the circuit is in the original state described above, and that a Done event is the first to arrive. This will make $DD_0$ high, selecting elements 81, 83, and 88. Depending on element 88's original condition, either $GA_2$ or $GB_2$ is no longer being driven, but will still retain its initial state. Both elements 81 and 83 are selected, but no decision has been made. Next, assume that concurrent request arrive on $RA_0$ and $RB_0$. Elements 81 and 83 see these input signals as uncontested, and each drives its own output node accordingly. Thus, $GA_0$ and $GB_0$ can both go high concurrently. This capability is made possible by the three conductor signaling scheme of the invention. An advance of the done signal DD places two separate elements potentially active, selecting the appropriate two for the anticipated advance of the request signals, RA and RB.

Figure 5:
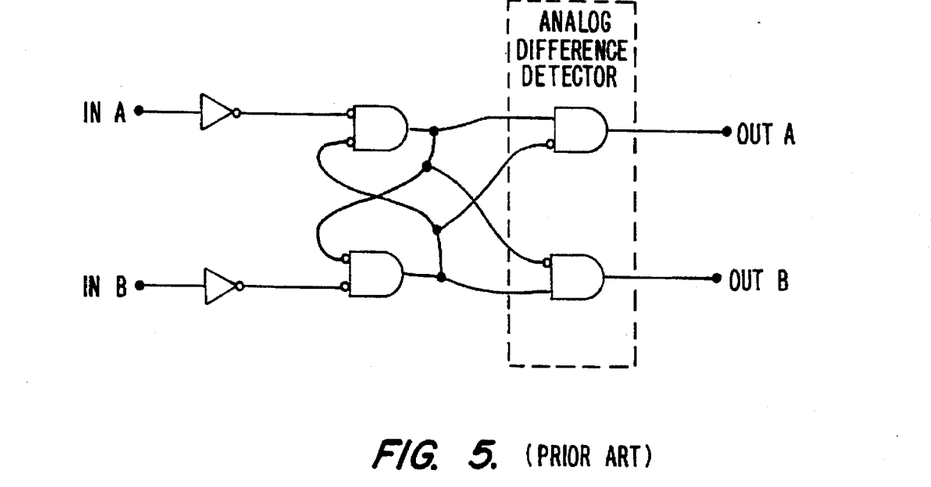
FIG. 5 is a more detailed schematic of the mutual exclusion element shown in FIG. 4.

FIG. 5 is a circuit schematic of the well known circuitry in a single mutual exclusion element shown as a small box in FIG. 4. In essence, FIG. 5 passes a signal only from either input node IN A to node OUT A or from IN B to OUT B. The well known analog difference detector allows an output signal only when the output signal from the preceding flip-flop is stable.

Figure 6:
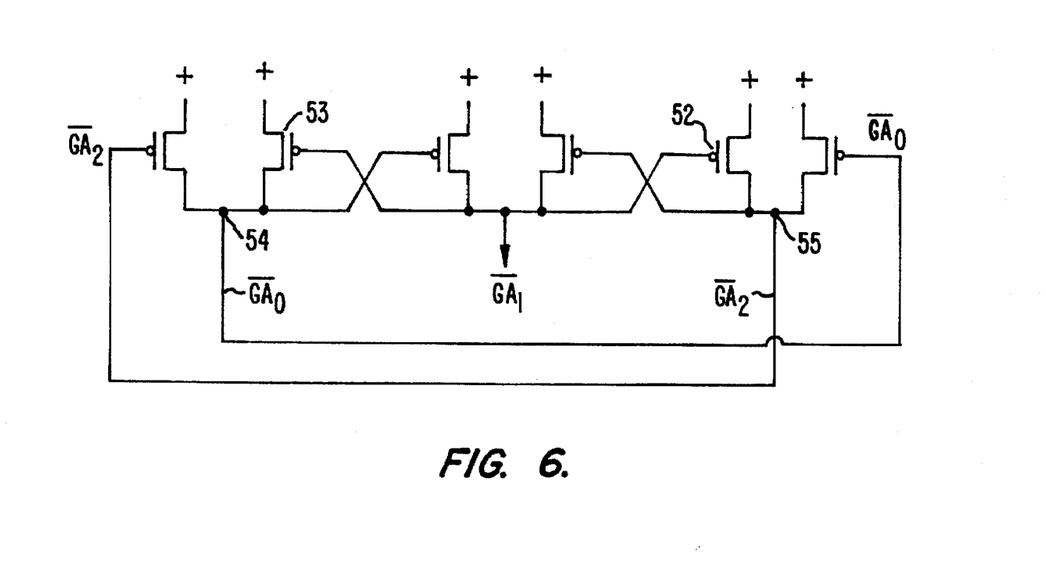
FIG. 6 is a circuit schematic of a round robin pull-down circuit.

FIG. 6 is a logic schematic illustrating the round robin pull-down circuit illustrating how it is coupled to the GA output lines of the arbiter shown in FIG. 4. A similar circuit will be coupled to the GB output lines. The circuit of FIG. 6 operates under control of the output lines GA. For example, if $GA_1$ goes high, the complement of $GA_1$ is low, turning on transistors 52 and 53. These pull the complementary outputs of $GA_0$ and $GA_2$ high, making $GA_0$ and $GA_2$ low.

The preceding has been an explanation of the preferred embodiments of the invention. In particular, although the invention has been described as using three conductor signalling, it will be understood that four, or more, conductors may also be used. Similarly, although specific circuits have been described, these are for the purpose of explanation. The scope of the invention is set forth in the appended claims.

What is claimed is:

1. A method of transmitting information over at least three conductors comprising:

defining a sequence of activity of the three conductors for information transfer over the conductors;

placing a first conductor in an active state to designate the occurrence of an event;

placing a second conductor in an active state to designate the occurrence of another event;

placing a third conductor in an active state to designate the occurrence of a further event; and returning the first, second and third conductors to an inactive state after each is active quickly enough to not have all three conductors active at the same time.

2. A method as in claim 1 wherein the step of returning the first, second and third conductors to an inactive state after each is active is performed quickly enough that each conductor is ready to be placed in an active state when its turn arrives.

3. A method as in claim 1 wherein:
   an active state comprises placing a conductor at a first potential;
   an inactive state comprises placing a conductor at a second potential; and
   an event comprises performing a transition between the second potential and the first potential.

4. A method as in claim 1 wherein:
   each conductor is selectively coupled to a potential source to thereby cause it to have an initial potential;
   the active state comprises changing the initial potential to a different potential, maintaining it for a set period, and returning it to the original potential; and
   the inactive state comprises not changing the potential of the conductor.

5. A system for generating output signals in response to certain input signals comprising:
   a logic element having a first and a second set of input terminals, and a set of output terminals;
   a first, second and third conductor coupled to the first set of input terminals of the logic element to supply a first input signal thereto, the first input signal being transmitted over the three conductors in a required sequence of activity of the three conductors in which the first conductor is in an active state to designate the occurrence of an event, then the second conductor is placed in an active state to designate the occurrence of another event, and then the third conductor is placed in an active state to designate the occurrence of a further event, and the conductors are returned to an inactive state after each is active quickly enough to not have all three conductors active at the same time;
   a fourth, fifth, and sixth conductor coupled to the second set of input terminals of the logic element to supply a second input signal thereto, the second input signal being transmitted over the three conductors in a required sequence of activity of the three conductors in which the first conductor is in an active state to designate the occurrence of an event, then the second conductor is placed in an active state to designate the occurrence of another event, and then the third conductor is placed in an active state to designate the occurrence of a further event, and the conductors are returned to an inactive state after each is active quickly enough to not have all three conductors active at the same time; and
   a seventh, eighth, and ninth conductor coupled to the set of output terminals of the logic element to receive an output signal therefrom, the output signal being transmitted over the three conductors in a required sequence of activity of the three conductors in which the first conductor is in an active state to designate the occurrence of an event, then the second conductor is placed in an active state to designate the occurrence of another event, and then the third conductor is placed in an active state to designate the occurrence of a further event, and the conductors are returned to an inactive state after each is active quickly enough to not have all three conductors active at the same time.

6. A system as in claim 5 wherein the logic element provides an output signal after it receives an input signal on either of the first and second sets of input terminals.

7. A circuit coupled to a first set of three conductors A1, A2, and A3, and coupled to a second set of three conductors B1, B2, and B3 for detecting when input signals are present on each conductor of one of the pairs of conductors Ax, By, where x and y each have the values 1, 2, or 3, and where x is not necessarily equal to y, the circuit comprising:
   a first node coupled to a first output conductor, to a first controllable reset circuit, and to a first control circuit;
   a second node coupled to a second output conductor to a second controllable reset circuit, and to a second control circuit;
   a third node coupled to a third output conductor, to a third controllable reset circuit, and to a third control circuit;
   three pairs of conductors Ax and By being coupled to the each of the first, second and third control circuits so that no single control circuit has a common pair of conductors Ax, By to any other control circuit, input signals on both conductors of any one pair of the three pairs of conductors causing a change in the state of the first node, second or third node; and
   control means coupled to each of the first, second, and third reset circuits and coupled to each of the first, second, and third output conductors for permitting only two of the output conductors to be in an active state at any given time to thereby indicate the presence of input signals on one of the pairs of conductors Ax, By.

8. A system as in claim 7 wherein the logic element provides an output signal after it receives an input signal on each of the first and second sets of input terminals.

9. A circuit coupled to a first set of three conductors A1, A2, and A3, and coupled to a second set of three conductors B1, B2, and B3 for detecting when input signals are present on each conductor of one of the pairs of conductors Ax, Bx, the circuit comprising:
   a first node coupled to a first output conductor, to a first controllable reset circuit, and to a first control circuit;
   a second node coupled to a second output conductor to a second controllable reset circuit, and to a second control circuit;
   a third node coupled to a third output conductor, to a third controllable reset circuit, and to a third control circuit;
   conductors A1 and B1 being coupled to the first control circuit to cause it to change the state of the first node in response to input signals being present on both the conductors A1 and B1;
   conductors A2 and B2 being coupled to the second control circuit to cause it to change the state of the second node in response to input signals being present on both the conductors A2 and B2;
   conductors A3 and B3 being coupled to the third control circuit to cause it to change the state of the third node in response to input signals being present on both the conductors A3 and B3; and
   control means coupled to each of the first, second, and third reset circuits and coupled to each of the first, second, and third output conductors for permitting only two of the output conductors to be in an active state at any given time to thereby indicate the presence of input signals on one of the pairs of conductors Ax, Bx.

10. A system for arbitrating between requests and in response generating an output signal granting one of the requests, the system comprising:
   two sets of request conductors, each including three lines, for supplying requests to the system;
   two sets of grant conductors, each including three lines, for indicating when a request has been granted;

a logic element coupled to the two sets of request conductors and the two sets of grant conductors for receiving signals indicative of requests from the request conductors and in response thereto supplying signals over at least one set of the grant conductors indicative of the set of request conductors having requests being granted.

11. A system as in claim 10 further comprising a set of complete conductors, also of three lines, for indicating when a request has been completed; and wherein the logic element is also coupled to the set of complete conductors for receiving signals therefrom.

12. A circuit comprising:

a first set of three input conductors $RA_0$, $RA_1$, and $RA_2$;

a second set of three input conductors $RB_0$, $RB_1$, and $RB_2$;

a first set of three output conductors $GA_0$, $GA_1$, and $GA_2$;

a second set of three output conductors $GA_0$, $GA_1$, and $GA_2$;

nine elements, each one of which is coupled to one of the RA input conductors, and one of the RB input conductors, such that each element is coupled to a different pair $RA_x$, $RB_y$, than any other element, each element also being connected to one of the GA output conductors, and one of the GB output conductors, such that each element connected to $RA_x$ is coupled to $GA_x$, and each element coupled to $RB_x$ is coupled to $GB_x$; and three sets of three input conductors $DD_0$, $DD_1$, and $DD_2$ coupled to the nine elements such that no set of three elements coupled to any one RA, RB, GA, or GB conductor has any one DD connection in common.

13. A circuit as in claim 12 wherein each element further comprises:

a mutual exclusion circuit connected to one of the RA conductors and one of the RB conductors;

a first AND gate having one input terminal connected to the mutual exclusion circuit, the other input terminal coupled to the DD input conductor, and an output terminal coupled to the GA conductor; and a second AND gate having one input terminal connected to the mutual exclusion circuit, the other input terminal coupled to the DD input conductor, and an output terminal coupled to the GB conductor.

* * * * *